3,244,646
POLYMERIZATION OF EPOXIDES USING AS CATALYST A METAL ALKOXIDE-PHOSPHOROUS ACID REACTION PRODUCT

Paul A. Naro, Woodbury, and Robert D. Offenhauer, Sewell, N.J., assignors to Socony Mobil Oil Company, Inc., a corporation of New York
No Drawing. Filed Jan. 4, 1962, Ser. No. 164,376
7 Claims. (Cl. 260—2)

This invention relates to a polymerization catalyst and a process for utilizing said catalyst for the polymerization of epoxide compounds. More particularly, this invention relates to the process for polymerizing of vicinal epoxide compounds in the presence of catalytic amounts of a polymerization catalyst prepared by reacting a Group IIIb metal alkoxide and a phosphorous-containing acid, hereinafter described, to produce solid polymers.

The polymerization of vicinal epoxide compounds is known in the art wherein various polymerization catalyst systems are utilized. The difficulty which arises in the epoxide polymerization process relates to the selectivity of the types of catalysts which are used. Many known polymerization catalysts will not effectively polymerize vicinal epoxide compounds, in particular propylene oxide, to solid polymers. For example, boron trifluoride will not effectively polymerize propylene oxide to form a solid polymer but will readily polymerize other vicinal epoxide compounds such as ethylene oxide, isobutylene oxide, among others, to form solid polymers. Propylene oxide, on the other hand, is known to polymerize rapidly in the presence of alkalies and acids and even explosively with a Friedal-Crafts catalyst such as stannic chloride, but the products are generally viscous liquids of a low degree of polymerization. There are, however, various catalysts such as ferric hydroxide, stannous organic acid salts, among others which are known to polymerize vicinal epoxide compounds including propylene oxide to solid polymers. It is the principal object of this invention to provide an additional and novel process for the catalytic polymerization of vicinal epoxide compounds, including propylene oxide, to form solid polymeric materials utilizing a novel polymerization catalyst prepared by the reaction of a Group IIIb metal alkoxide and a phosphorous-containing acid.

In one embodiment, a polymerization catalyst has been discovered which provides for catalytic polymerization of vicinal epoxide compounds, including propylene oxide, to form solid homopolymers or solid copolymers thereof. The catalyst of the present invention is prepared by the reaction in a liquid medium of a metal alkoxide wherein the metal portion is selected from the Group IIIb of the Periodic Table which includes boron, aluminum, gallium, indium and thallium with a phosphorous-containing acid having the following formula:

$$R-\overset{O}{\underset{OH}{\overset{\|}{P}}}-OH$$

wherein R represents a hydroxyl group or an organic radical such as hydrocarbon radicals including alkyl, cycloalkyl, aryl, aralkyl or alkaryl and the like, containing from 1 to 18 carbon atoms. Suitable phosphorous-containing acids can include phosphoric acid, preferably orthophosphoric acid, methylphosphonic acid, ethylphosphonic acid, hexylphosphonic acid, phenylphosphonic acid, alkylsubstituted-phenylphosphonic acid, cyclohexylphosphonic acid, alkylsubstituted-cyclohexylphosphonic acid, and the like. The metal alkoxide, used herein, can include any Group IIIb alkoxide which contains from 3 to 18 carbon atoms in the alkoxide group and which is soluble in an inert organic solvent such as benzene, acetone, n-hexane and the like. The preferred metal alkoxide is the aluminum isopropoxide.

In order for the reaction products of the metal alkoxides and phosphorous-containing acids to be effective catalysts in the polymerization of vicinal epoxy compounds, especially propylene oxide, to solid polymers, it is essential that an organic constituent obtained from the starting materials and containing at least about 5 weight percent carbon based on the catalyst, be incorporated in the catalyst reaction product. It is not known in what form the organic constituent exists; however, it can be postulated that in the reaction of aluminum isopropoxide with orthophosphoric acid, the organic constituent may likely exist in some form of alkoxide since this is the only organic constituent available. Other organic constituents may be made available in the catalyst in the use of the organic phosphorous-containing acids, hereinbefore described, as starting materials. The amount of organic constituent present in the catalyst will be limited by the amount incorporated in the reaction product, and can be determined as carbon content ranging from about 5 weight percent to as high as about 50 weight percent, based on the overall catalyst.

The catalysts used herein can be prepared by the reaction of at least a 1:1 molar ratio of metal alkoxide to a phosphorous-containing acid, preferably 85 to 100 percent liquid form phosphoric acid at a temperature from about 20° C. to the boiling point of the organic solvent for a sufficient period of time to complete the reaction, i.e., until no further reaction product is formed. After the reaction is complete, the precipitate which has formed can be filtered, dried and used as the catalyst. The catalyst can be dried by placing the product in an oven at 110° F. or can be placed under vacuum to remove the free solvents.

In another embodiment, a process for the catalytic polymerization of vicinal epoxide compounds to form solid homopolymers or solid copolymers thereof has been discovered which comprises contacting the vicinal epoxide compounds with a catalyst, hereinbefore described, at reaction temperatures in the range from about 20° C. to about 150° C. for a sufficient period of time to polymerize the vicinal epoxide compound. It should be noted at this time that the expression "vicinal epoxide compound" as used herein, including the appended claims, refer to those organic compounds containing a single epoxy group wherein the oxygen atom is bonded to vicinal carbon atoms, i.e.

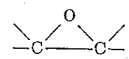

and the remaining portion of the compound is free from unsaturation other than aromatic unsaturation.

The vicinal epoxide compounds which can be polymerized to solid homopolymers in the process of this invention can be characterized by the following structure:

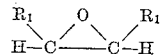

wherein each $R_1$, individually, can represent hydrogen, haloalkyl, haloaryl or a hydrocarbon radical, for example, alkyl, aryl, cycloalkyl, aralkyl and the like. Illustrative $R_1$ radicals include methyl, ethyl, propyl, butyl, isobutyl, hexyl, dodecyl, octadecyl, phenyl, chlorophenyl, bromobenzyl, tolyl, ethylphenyl, cyclopentyl, cyclohexyl and the like. In addition, $R_1$ variables collectively can represent a divalent saturated aliphatic hydrocarbon radical to form a cycloaliphatic hydrocarbon epoxide compound preferably containing from 4 to 10 carbon atoms which includes: epoxycycloalkane; alkyl-substituted epoxycycloalkane, epoxycyclobutane, epoxycyclopentane, epoxycyclohexane, epoxycycloheptane, epoxycyclooctane, methyl epoxycyclopentane, ethylepoxycyclohexane and the like. Other vicinal epoxide compounds which can be employed include the lower epoxide compounds, i.e. ethylene oxide, propylene oxide, epichlorhydrin, butylene oxide, isobutylene oxide, the epoxypentanes, the epoxyhexanes. Other suitable epoxide compounds include the epoxyoctanes, 5-butyl-3,4-epoxynonane, 1,2-epoxydodecane, 1,2-epoxyhexadecane, 4-cyclohexyl-2,3-epoxybutane, styrene oxide, chlorostyrene oxide, ethylstyrene oxide and the like. The preferred epoxide compounds to be employed are the lower epoxide compounds containing no more than 6 carbon atoms.

In addition to the homopolymers above, copolymers of the various epoxide compounds, heretofore described, can be produced by the process of this invention. It is preferred, however, in the production of copolymers to utilize the lower epoxide compounds or admixture thereof, alone or with other epoxide compounds in amounts comprising up to about equal portions by weight of said epoxide compounds.

The catalyst concentration used in accordance with the method of this invention can be varied over a broad range and can be selected on the basis of the rate of polymerization desired and the polymerization temperature to be used. It has been found that catalyst concentrations from about 0.005, or lower, to about 15 weight percent, or higher, preferably from about 0.1 to about 5 weight percent based on the weight of the vicinal epoxide compound used may be employed.

The temperature employed in the polymerization may vary over a considerable range depending upon the vicinal epoxide and catalyst being employed. In most cases, the temperature will vary from about 20° C. to about 150° C. Preferred temperatures range from about 70° C. to about 110° C. The period of time required for the polymerization reaction can range from several hours to as long as 30 days or longer, depending on the concentration of the catalyst, temperature, the particular catalyst employed, the epoxide compound to be polymerized and other factors. Atmospheric, superatmospheric or subatmospheric pressures may be utilized.

In the process of this invention, the polymerization may be carried out in solution, emulsion, suspension, and bulk systems. If solvents are employed, they can be solvents for the monomers and polymer or they can be solvents for the monomers and nonsolvents for the polymers. Examples of solvents useful in a solution polymerization include acetone, diethyl ether, ethanol, ethyl acetate, acetophenone, carbon tetrachloride, benzene, n-hexane, petroleum ether, diisopropyl ether and the like.

After the polymerization reaction is complete, the unreacted materials can be separated from the vicinal epoxide polymer by any suitable method such as solvent extraction, precipitation, distillation, filtration and the like. The polymer product can then be worked up in any suitable manner.

The polymeric materials that can be obtained by the practice of the invention are solid substances that have at least one and usually more of a variety of uses including the preparation of molds, films, fibers, coating applications, among others.

The following examples will serve to illustrate the process of the invention without limiting the same:

*Example 1*

To a solution of 102 parts of aluminum isopropoxide in 400 parts benzene, 58 parts of 85 percent phosphoric acid is added dropwise with stirring at room temperature. An immediate precipitate forms during the exothermic reaction. After stirring for 4 hours the precipitate is filtered and the resultant solid is dried in a vacuum at ambient temperatures. A solid having a surface area of 39 square meters per gram is obtained and analyzed as follows:

| | Weight percent |
|---|---|
| Aluminum | 13.8 |
| Phosphorous | 16.8 |
| Carbon | 9.04 |
| Hydrogen | 4.0 |
| Oxygen | [1]57.0 |

[1] By difference.

*Example 2*

A Pyrex pressure reactor is charged with 19.5 grams of freshly distilled propylene oxide and 0.39 gram of the catalyst described in Example 1. The reactor is flushed with dry nitrogen and heated slowly to 80° C. while the mixture is stirred magnetically and maintaining said temperature under autogenous pressure for 67 hours. The resulting product is then stripped of unpolymerized material by a benzene freeze-dry procedure. There is obtained 8.8 grams of white solid polymer having an intrinsic viscosity of 1.2 (measured in benzene).

*Example 3*

A glass autoclave is charged with four parts of the catalyst of Example 1 and 100 parts of styrene oxide. The reactor is flushed with dry nitrogen and heated slowly to 120° C. while the mixture is stirred under autogenous pressure and maintaining said temperature for 500 hours. The resulting product is then stripped of unpolymerized material by a benzene freeze-dry procedure. There is obtained 5 parts of a solid polymer.

*Example 4*

A glass autoclave is charged with 0.5 gram of the catalyst of Example 1 and 50 grams of propylene oxide. The mixture is stirred at room temperature for 60 days. The resulting product is then stripped of unpolymerized material by a benzene freeze-dry procedure. There is obtained a white solid polymer having an intrinsic viscosity of 1.25 measured in benzene.

*Example 5*

A glass autoclave is charged with two parts of the catalyst of Example 1 and 100 parts 1,2-epoxybutane. The reactor is flushed with dry nitrogen and heated slowly to 90° C. while the mixture is stirred under autogenous pressure and maintaining said temperature for 200 hours. The resulting product is then stripped of unpolymerized material by a benzene freeze-dry procedure. There is obtained 25 parts of a solid polymer.

*Example 6*

A Pyrex pressure reactor is charged with 100 parts ethylene oxide and 2 parts catalyst of Example 1. The reactor is flushed with dry nitrogen and heated slowly to 70° C. while the mixture is stirred magnetically and maintaining said temperature under autogenous pressure for 64 hours. The resulting product is then stripped of unpolymerized material by a benzene freeze-dry procedure. There is obtained 95 parts of a hard, solid polymer having a reduced viscosity of 1.0 in acetonitrile.

*Example 7*

A glass autoclave is charged with 50 parts of propylene oxide, 50 parts of ethylene oxide and 2 parts of catalyst of Example 1. The reactor is flushed with dry nitrogen and heated slowly to 80° C. while the mixture is stirred under autogenous pressure and maintaining said temperature for 60 hours. The resulting product is then stripped of unpolymerized material by a benzene freeze-dry procedure. There is obtained 70 parts of a white, solid polymer.

Example 8

In a container, 15.8 parts of phenylphosphonic acid and 20.4 parts of aluminum isopropoxide are mixed in 100 milliliters of dry ether with stirring to form a precipitate. After the percipitation has been completed, the solids are filtered and dried in a vacuum at ambient temperatures.

A glass autoclave is charged with two parts of the above catalyst and 100 parts of propylene oxide. The reactor is flushed with dry nitrogen and heated slowly to 80° C. with stirring under autogenous pressure, then maintaining said temperature for 44 hours, the resulting product is then stripped of unpolymerized material by a benzene freeze-dry procedure. There is obtained 61 parts of a white, solid polymer.

Example 9

To determine the effect of the organic material, 10 grams of the catalyst of Example 1 were extracted with ether at the reflux temperature of ether for 3 hours, then extracted with benzene at the reflux temperature of benzene for 3 hours. The extracted material was dried in air for approximately 16 hours and calcined at 110° F. for a period of time until no further weight loss of the material was detected. The surface area of the resulting material was 28 square meters per gram. A portion of this material was used for the polymerization of propylene oxide under the same conditions as Example 2. The material used herein as the catalyst was completely ineffective since no solid polymer of propylene oxide was obtained.

What is claimed is:

1. A process which comprises polymerizing a vicinal monoepoxide compound free from ethylenic and acetylenic unsaturation in the presence of about 0.005 to 15 weight percent, based on the weight of the monoepoxide compound, of a catalyst containing at least about 5 weight percent carbon prepared by the reaction in an inert organic liquid medium of at least about a 1 to 1 molar ratio of a metal alkoxide containing from 3 to 18 carbon atoms with the metal being selected from the group consisting of boron, aluminum, gallium, indium and thallium, with a phosphorous-containing acid having the formula:

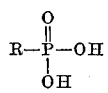

wherein R represents a member selected from the group consisting of hydroxyl and hydrocarbon radicals, and recovering the solid reaction product; the polymerization temperature being from about 20° C. to about 150° C.; for a period of time sufficient to produce a solid polymer.

2. A process according to claim 1, wherein the metal is aluminum.

3. A process which comprises polymerizing a vicinal monoepoxide compound free from ethylenic and acetylenic unsaturation in the presence of about 0.005 to about 15 weight percent, based on the weight of the monoepoxide compound, of a catalyst containing between about 5 to 50 weight percent carbon prepared by the reaction in an inert organic liquid medium of at least about a 1 to 1 molar ratio of aluminum alkoxide containing from 3 to 18 carbon atoms with a phosphorous-containing acid having the formula:

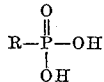

wherein R represents a member selected from the group consisting of hydroxyl and hydrocarbon radicals, and recovering the resultant solid reaction product; the polymerization temperature being from about 70° C. to about 120° C.; for a period of time sufficient to produce a solid polymer.

4. A process according to claim 3 wherein the aluminum alkoxide is aluminum isopropoxide, and wherein the phosphorous containing acid is phosphoric acid.

5. A process which comprises polymerizing a vicinal monoepoxide compound containing from 2 to 6 carbon atoms and free from ethylenic and acetylenic unsaturation in the presence of about 0.1 to about 5 weight percent, based on the weight of the monoepoxide compound, of a catalyst containing between about 5 to 50 weight percent carbon prepared by the reaction in an inert organic liquid medium of at least a 1 to 1 molar ratio of a metal alkoxide containing from 3 to 18 carbon atoms with the metal being selected from the group consisting of boron, aluminum, gallium, indium and thallium, with a phosphorous-containing acid having the formula:

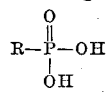

wherein R represents a member selected from the group consisting of hydroxyl and hydrocarbon radicals, and recovering the resulting solid reaction product; the polymerization temperature being from about 70° C. to about 120° C.; for a period of time sufficient to produce a solid polymer.

6. A process according to claim 5 wherein the vicinal monoepoxide compound is ethylene oxide.

7. A process according to claim 5 wherein the vicinal monoepoxide compound is propylene oxide.

References Cited by the Examiner

UNITED STATES PATENTS

| | | | |
|---|---|---|---|
| 2,596,497 | 5/1952 | Mavity | 252—435 X |
| 2,713,037 | 7/1955 | Kemberlin | 252—435 X |
| 2,870,099 | 1/1959 | Borrows et al. | 260—2 |
| 2,870,101 | 1/1959 | Stewart. | |
| 2,885,417 | 5/1959 | Heyden | 260—448 |
| 3,018,258 | 1/1962 | Meier et al. | 260—2 X |
| 3,088,908 | 5/1963 | Hansford | 252—435 X |

FOREIGN PATENTS

| | | |
|---|---|---|
| 594,025 | 3/1960 | Canada. |
| 1,061,478 | 7/1959 | Germany. |

WILLIAM H. SHORT, *Primary Examiner.*

JOSEPH R. LIBERMAN, *Examiner.*